United States Patent
Kim et al.

(10) Patent No.: US 10,491,821 B2
(45) Date of Patent: Nov. 26, 2019

(54) APPARATUS OF STABILIZING SHAKING IMAGE AND CONTROLLING METHOD THEREOF

(71) Applicant: Samsung Electronics Co., Ltd, Suwon-si (KR)

(72) Inventors: Han Sung Kim, Seongnam-si (KR); Jae Mu Yun, Hwaseong-si (KR); Jeong Won Lee, Seongnam-si (KR); Jae Joon Moon, Anyang-si (KR); Jae Hyoung Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/890,334

(22) Filed: Feb. 6, 2018

(65) Prior Publication Data

US 2018/0227494 A1 Aug. 9, 2018

(30) Foreign Application Priority Data

Feb. 6, 2017 (KR) .......................... 10-2017-0016304

(51) Int. Cl.
*H04N 5/232* (2006.01)
*H04N 5/235* (2006.01)

(52) U.S. Cl.
CPC ....... *H04N 5/23258* (2013.01); *H04N 5/2353* (2013.01); *H04N 5/23277* (2013.01)

(58) Field of Classification Search
CPC ............. H04N 5/23258; H04N 5/2353; H04N 5/23277
See application file for complete search history.

(56) References Cited

U.S. PATENT DOCUMENTS

| 7,965,317 B2 | 6/2011 | Tico et al. |
| 8,373,761 B2 | 2/2013 | Jang et al. |
| 9,357,130 B2 | 5/2016 | Sachs et al. |
| 2007/0296821 A1* | 12/2007 | Kakkori ............ G03B 7/00 348/208.6 |

(Continued)

FOREIGN PATENT DOCUMENTS

| JP | 2007-324770 A | 12/2007 |
| JP | 2008-275826 A | 11/2008 |

(Continued)

OTHER PUBLICATIONS

ISA/KR, "International Search Report," International Application No. PCT/KR2018/001312, dated Jul. 2, 2018, 9 pages.

*Primary Examiner* — Timothy J Henn

(57) ABSTRACT

An electronic apparatus includes a camera module including an optical image stabilizer (OIS) module and an image sensor, and at least one processor. The at least one processor is configured to control the camera module to calculate an error based on an operation of the OIS module responsive to movement of the electronic apparatus during at least part of time of the first exposure, to interrupt the first exposure and obtain a first image corresponding to the first exposure, based on the fact that the calculated error exceeds a critical value, to obtain a second image corresponding to the second exposure, and to generate a third image, in which at least part of the movement is corrected, by using the first image and the second image.

20 Claims, 14 Drawing Sheets

(56) References Cited

U.S. PATENT DOCUMENTS

| | | | |
|---|---|---|---|
| 2009/0009612 A1* | 1/2009 | Tico | H04N 1/00307 |
| | | | 348/208.1 |
| 2009/0033750 A1* | 2/2009 | Batur | H04N 5/23248 |
| | | | 348/208.1 |
| 2009/0115860 A1* | 5/2009 | Nakashima | H04N 5/23248 |
| | | | 348/208.99 |
| 2010/0149352 A1 | 6/2010 | Jang et al. | |

FOREIGN PATENT DOCUMENTS

| KR | 10-2010-0009064 A | 1/2010 |
|---|---|---|
| KR | 10-2010-0067406 A | 6/2010 |
| KR | 10-2010-0112788 A | 10/2010 |

\* cited by examiner

APPARATUS OF STABILIZING SHAKING IMAGE AND CONTROLLING METHOD THEREOF

CROSS-REFERENCE TO RELATED APPLICATION(S)

This application is related to and claims the benefit of Korean Patent Application No. 10-2017-0016304 filed on Feb. 6, 2017, the contents of which are incorporated herein by reference.

TECHNICAL FIELD

The present disclosure relates to an electronic apparatus that stabilizes an image and a controlling method of an electronic apparatus.

BACKGROUND

As information technologies are highly developed, a camera has evolved from a traditional film camera to a digital camera. The digital camera may convert light into an electrical image signal and may store the electrical image signal as digital data (image data).

In the case where a photographer takes a digital camera with his/her hand and captures an external object, hand shaking may occur in all directions. In the case where the hand shaking occurs when the external object is captured, the quality of the generated image may deteriorate. In recent years, it has become increasingly important for the digital camera to obtain sharp images while the digital camera provides high-magnification and high-resolution functions. In the case of a high magnification and high-pixel camera, the influence of the hand shaking is increasing.

SUMMARY

The basic principle of an anti-shake technology is to move a lens, an image sensor, pixels of an image, or the like in the direction opposite to the movement of the electronic apparatus, thereby canceling the movement of the electronic apparatus according to hand shaking on the image. The anti-shake technique includes an optical image stabilizer (OIS) and an electronic image stabilizer (EIS). The OIS provides a clear image by moving a configuration for capturing an external object, but a physical configuration is required to implement the technology. Although the EIS may implement a technique to stabilize an image in software, it is difficult to provide a clear image.

In the case of capturing an image in a dark place, the exposure time may be longer for the purpose of allowing a large amount of light to enter the image sensor, and if the exposure time is longer, it may be very vulnerable to movement of the electronic apparatus due to the hand shaking. In addition, it is possible to generate an unclear image when the same exposure time is applied in the same situation without considering the changeable movement of the electronic apparatus.

Aspects of the present disclosure are to address at least the above-mentioned problems and/or disadvantages and to provide at least the advantages described below. Accordingly, an aspect of the present disclosure is to provide an electronic apparatus that simultaneously applies OIS and EIS and is capable of changing an exposure time depending on the movement of the electronic apparatus to stabilize shaking image, and a controlling method of the electronic apparatus.

In accordance with certain embodiments of the present disclosure, an electronic apparatus includes a camera module including an optical image stabilizer (OIS) module and an image sensor, and at least one processor. The at least one processor is configured to control the camera module to initiate a first exposure for allowing light generated or reflected from an external object to enter the image sensor, to calculate an error based on an operation of the OIS module responsive to movement of the electronic apparatus during at least part of time of the first exposure, to interrupt the first exposure and obtain a first image corresponding to the first exposure, based on the fact that the calculated error exceeds a critical value, to initiate a second exposure for allowing light generated or reflected from the external object to enter the image sensor, in response to the interruption of the first exposure, to obtain a second image corresponding to the second exposure, and to generate a third image, in which at least part of the movement is corrected, by using the first image and the second image.

In accordance with some embodiments of the present disclosure, a controlling method of an electronic apparatus includes initiating a first exposure for allowing light generated or reflected from an external object to enter an image sensor, through a camera module, calculating an error based on an operation of an OIS module responsive to movement of the electronic apparatus sensed from a motion sensing module during at least part of time of the first exposure, interrupting the first exposure based on the fact that the calculated error exceeds a critical value, obtaining a first image corresponding to the first exposure, initiating a second exposure for allowing light generated or reflected from the external object to enter the image sensor, in response to the interruption of the first exposure, obtaining a second image corresponding to the second exposure, and generating a third image, in which at least part of the movement is corrected, by using the first image and the second image.

In accordance with certain embodiments of the present disclosure, a computer-readable recording medium has recorded a program performing a method. The method includes initiating a first exposure for allowing light generated or reflected from an external object to enter an image sensor, through a camera module, calculating an error based on an operation of an OIS module responsive to movement of an electronic apparatus sensed from a motion sensing module during at least part of time of the first exposure, interrupting the first exposure based on the fact that the calculated error exceeds a critical value, obtaining a first image corresponding to the first exposure, initiating a second exposure for allowing light generated or reflected from the external object to enter the image sensor, in response to the interruption of the first exposure, obtaining a second image corresponding to the second exposure, and generating a third image, in which at least part of the movement is corrected, by using the first image and the second image.

An electronic apparatus according to certain embodiments of the present disclosure may dynamically change the exposure time of an image sensor in consideration of the movement of an electronic apparatus to obtain a plurality of images, within a range that does not exceed a total exposure time needed to capture an external object and may generate the stabilized image by composing the obtained plurality of images.

In addition, an electronic apparatus according to certain embodiments of this disclosure may delay a time when the quantity of displacement by the movement of the electronic apparatus reaches a critical value, within a range that does not exceed the total exposure time by using OIS as well as EIS to minimize the number of images that are dividedly captured. As such, the electronic apparatus may rapidly compose a plurality of images.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
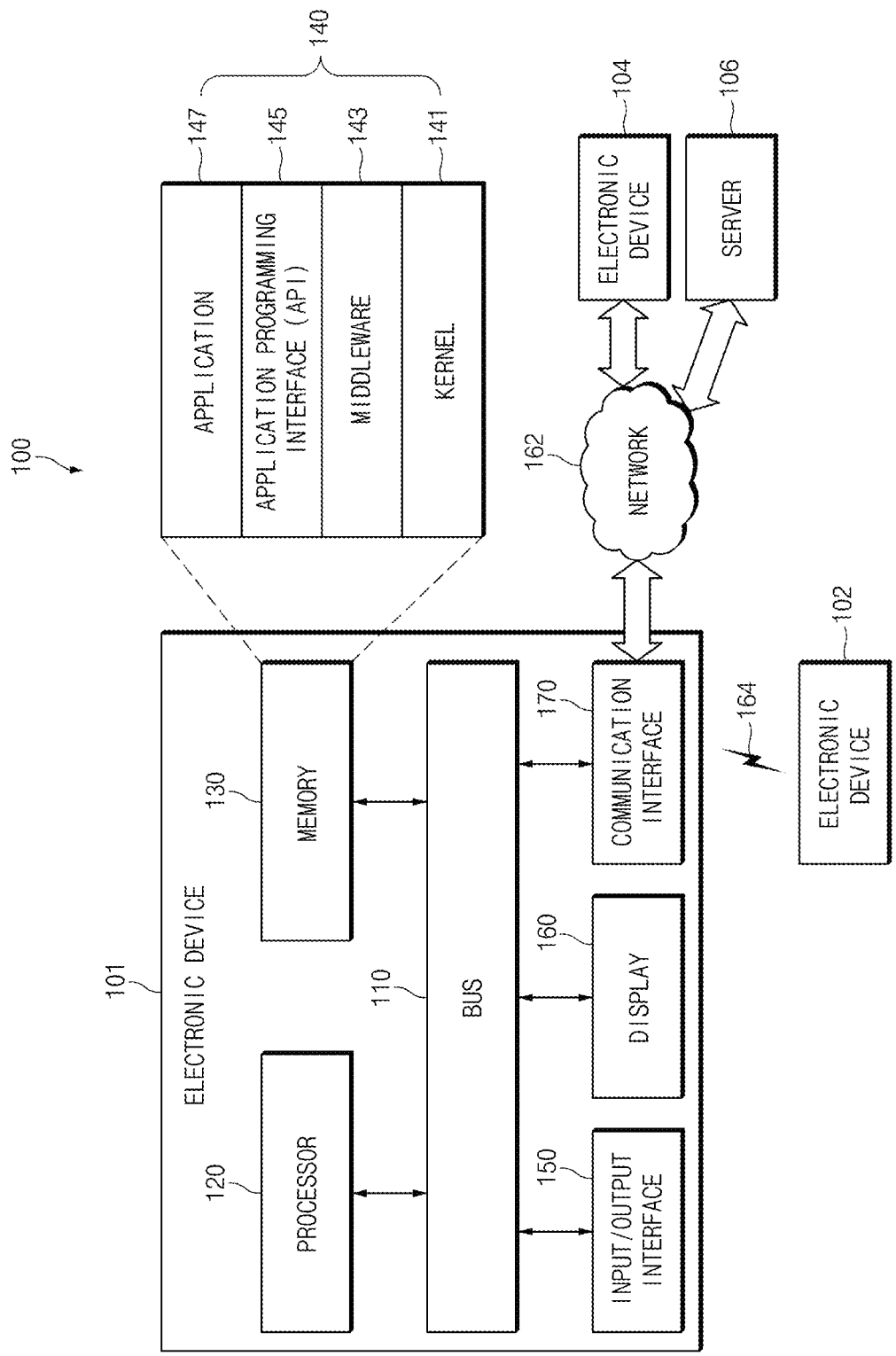
FIG. 1 illustrates, in block diagram format, an electronic apparatus in a network environment according to various embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present invention. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

FIG. 1 illustrates, in block diagram format, an electronic apparatus in a network environment system, according to various embodiments of the present disclosure.

Referring to FIG. 1, according to various embodiments, an electronic apparatus 101, 102, or 104, or a server 106 may be connected each other over a network 162 or a short range communication 164. The electronic apparatus 101 may include a bus 110, a processor 120, a memory 130, an input/output interface 150, a display 160, and a communication interface 170. According to an embodiment, the electronic apparatus 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic apparatus 101.

The memory 130 may include a volatile and/or nonvolatile memory. For example, the memory 130 may store instructions or data associated with at least one other element(s) of the electronic apparatus 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic apparatus 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic apparatus 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits an instruction or data input from a user or another external device, to other element(s) of the electronic apparatus 101. Furthermore, the input/output interface 150 may output an instruction or data, received from other element(s) of the electronic apparatus 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic apparatus 101 and an external device (e.g., the first external electronic apparatus 102, the second external electronic apparatus 104, or the server 106). For example, the communication interface 170 may be connected to the network 162 over wireless communication or wired communication to communicate with the external device (e.g., the second external electronic apparatus 104 or the server 106).

The wireless communication may include a cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, as illustrated in the element 164 of FIG. 1, the wireless communication may include, for example, at least one of wireless fidelity (Wi-Fi), light fidelity (Li-Fi), Bluetooth, Bluetooth low energy (BLE), Zigbee, near field communication (NFC), magnetic secure transmission (MST), radio frequency (RF), body area network (BAN), or a global navigation satellite system (GNSS).

The MST may generate a pulse in response to transmission data using an electromagnetic signal, and the pulse may generate a magnetic field signal. The electronic apparatus 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic apparatuses 102 and 104 may be a device of which the type is different from or the same as that of the electronic apparatus 101. According to certain embodiments, the server 106 may include a group of one or more servers. According to various embodiments, all or a portion of operations that the electronic apparatus 101 will perform may be executed by another or a plurality of electronic apparatuses (e.g., the electronic apparatus 102 or 104 or the server 106). According to an embodiment, in the case where the electronic apparatus 101 executes any function or service automatically or in response to a request, the electronic apparatus 101 may not perform the function or the service internally, but, alternatively additionally, it may request at least a portion of a function associated with the electronic apparatus 101 from another device (e.g., the electronic apparatus 102 or 104 or the server 106). The other electronic apparatus may execute the requested function or additional function and may transmit the execution result to the electronic apparatus 101. The other electronic apparatus (e.g., the electronic apparatus 102 or 104 or the server 106) may provide the requested function or service using the received result or may additionally process the received result to provide the requested function or service. To this end, for example, cloud computing, distributed computing, or client-server computing may be used.

Figure 2:
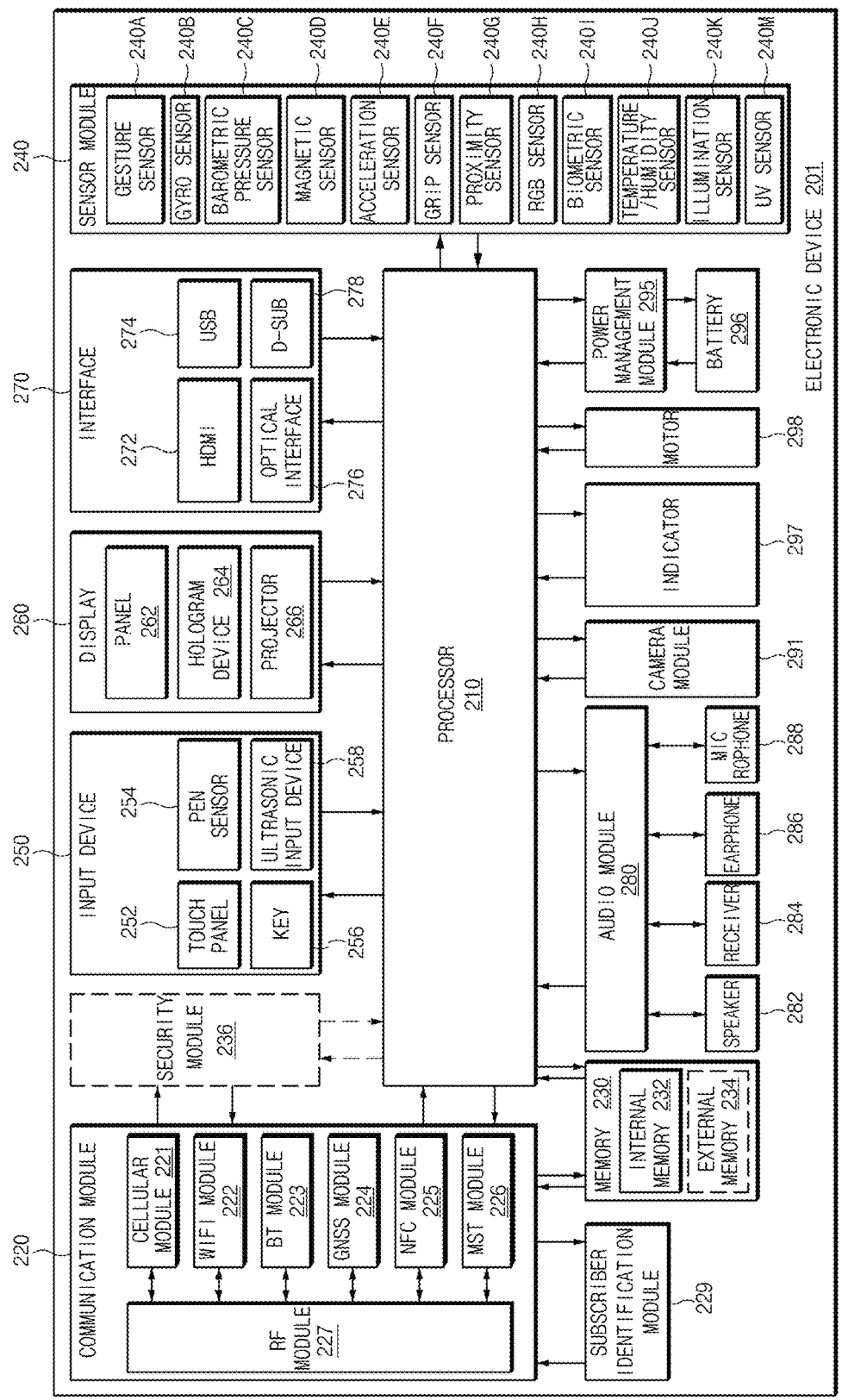
FIG. 2 illustrates in block diagram format a configuration of the electronic apparatus, according to various embodiments of this disclosure.

FIG. 2 illustrates, in block diagram format, a configuration of an electronic apparatus, according to various embodiments of the present disclosure.

Referring to the non-limiting example of FIG. 2, an electronic apparatus 201 may include, for example, all or a part of the electronic apparatus 101 illustrated in FIG. 1. The electronic apparatus 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may, according to certain embodiments, be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic apparatus 201 within a communication network by using the subscriber identification module (e.g., a SIM card) 229. According to at least one embodiment, the cellular module 221 may perform at least a portion of functions that the processor 210 provides. According to some embodiments, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic apparatus 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic apparatus 201. Furthermore, the security module 236 may operate based on an operating system (OS) that is different from the OS of the electronic apparatus 201. For example, the security module 236 may operate based on java card open platform (JCOP) OS.

The sensor module 240 may measure, for example, a physical quantity or may detect an operation state of the electronic apparatus 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic apparatus 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic apparatus 201. According to an embodiment, the panel 262 may include a pressure sensor (or a "force sensor") that is capable of measuring the intensity of pressure on the touch of the user. The pressure sensor may be integrated with the touch panel 252 or may be implemented with one or more sensors that are independent of the touch panel 252. According to an embodiment, the display 260 may further include a control circuit for controlling the panel 262, the hologram device 264, or the projector 266.

The interface 270 may according to certain embodiments, include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multimedia card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may capture a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic apparatus 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic apparatus 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic apparatus 201. The processing device for supporting the mobile TV may process media data according to the standards of digital multimedia broadcasting (DMB), digital video broadcasting (DVB), MediaFlo™, or the like.

Each of the above-mentioned elements of the electronic apparatus according to various embodiments of the present disclosure may be configured with one or more components, and the names of the elements may be changed according to the type of the electronic apparatus. In various embodiments, the electronic apparatus may include at least one of the above-mentioned elements, and some elements may be omitted or other additional elements may be added. Furthermore, some of the elements of the electronic apparatus according to various embodiments may be combined with each other so as to form one entity, so that the functions of the elements may be performed in the same manner as before the combination.

Figure 3A:
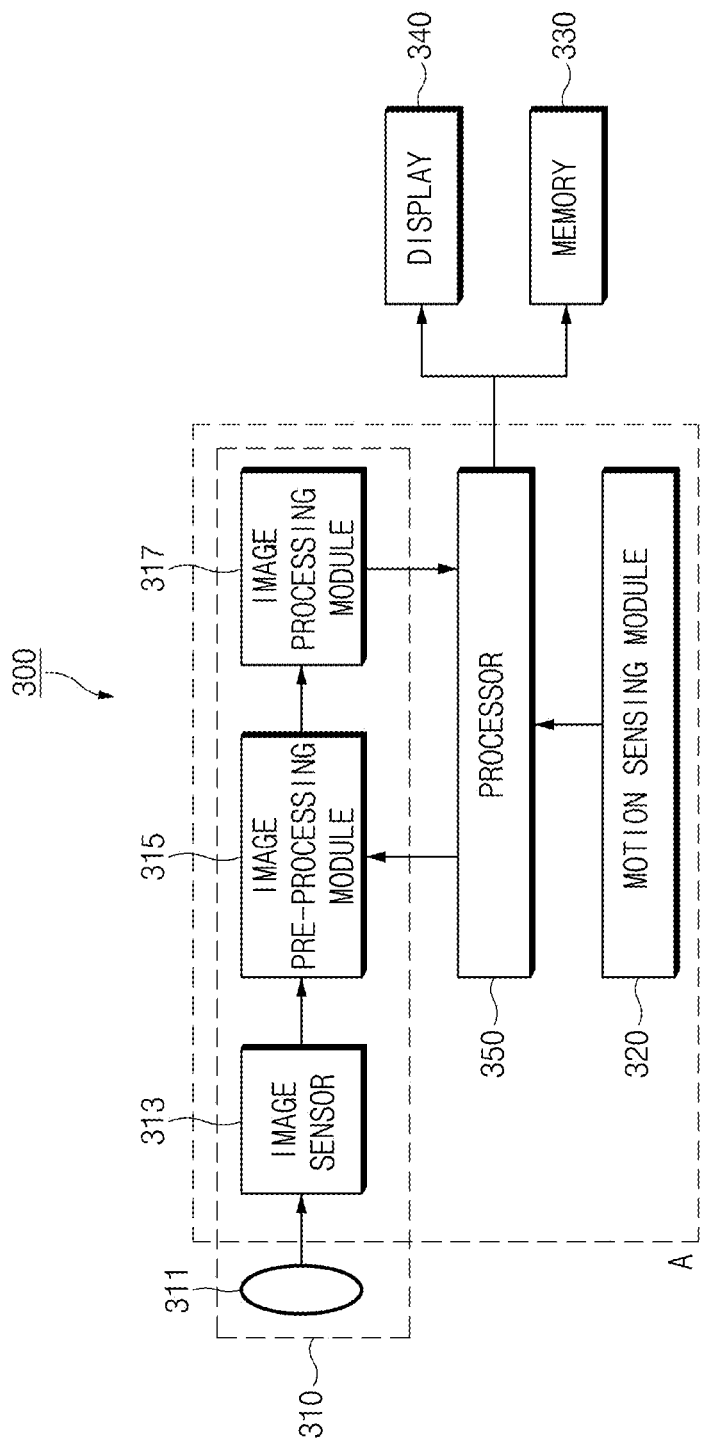
FIG. 3A illustrates a configuration of an electronic apparatus, according to certain embodiments of this disclosure.

FIG. 3A illustrates, in block diagram format a configuration of an electronic apparatus, according to certain embodiments.

Referring to the non-limiting example of FIG. 3A, an electronic apparatus 300 (e.g., the electronic apparatus 101 or 201) may include a camera module 310 (e.g., the camera module 291), a motion sensing module 320 (e.g., the sensor module 240), a memory 330 (e.g., the memory 230), a display 340 (e.g., the display 160 or 260), and a processor 350 (e.g., the processor 120 or 210).

The camera module 310 may, according to some embodiments, include a lens 311, an image sensor 313, an image pre-processing module 315, and an image processing module 317. For example, the image pre-processing module 315 and the image processing module 317 may be implemented with at least one image signal processor (ISP). According to various embodiments, the camera module 310 may be implemented without some elements or may be implemented to further include one or more elements not illustrated in FIG. 3A.

The lens 311 may focus light incident on the camera module 310 from the outside. The focused light may reach the image sensor 313 through the aperture. For example, the lens 311 may allow light reflected by a subject or light produced from the subject to reach a pixel array of the image sensor 313.

The image sensor 313 may include a pixel array in which a plurality of pixels are two-dimensionally arranged. The pixel array may include millions or tens of millions of pixel units, and one of a plurality of reference colors may be allocated to each of the pixel units. For example, the plurality of reference colors may include "red, green, and blue (RGB)" or "red, green, blue, and white (RGBW)". For example, the image sensor 313 may be implemented by using charge-coupled device (CCD) or complementary metal-oxide-semiconductor (CMOS).

According to certain embodiments, the image sensor 313 may generate an electrical signal in response to light incident from the outside. Image data may be generated based on the electrical signal. According to at least one embodiment, a time when the image sensor 313 is exposed to light (exposure time) may be controlled by the shutter. For example, if the shutter is opened for a long time, a relatively large amount of light may be incident on the image sensor 313; if the shutter is opened for a short time, a relatively little amount of light may be incident on the image sensor 313.

According to some embodiments, the image sensor 313 may transmit the image data to the image pre-processing module 315. For example, the image sensor 313 may transmit the image data to the image pre-processing module 315 through an interface that mediates data transfer between the image sensor 313 and the image pre-processing module 315.

The image pre-processing module 315 may pre-process the image data. For example, the image pre-processing module 315 may divide the total exposure time when light is incident on the image sensor 313 for the purpose of capturing an external object, and may obtain a plurality of images each of which is generated for each divided time. For example, the image pre-processing module 315 may dynamically divide the total exposure time. In other words, the image pre-processing module 315 may dynamically control the time when light is incident on the image sensor 313, within a range that does not exceed the total exposure time. According to certain embodiments, the image pre-processing module 315 may generate an image, the movement of which is corrected, by composing the obtained plurality of images.

According to some embodiments, the image pre-processing module 315 may transmit the stabilized image to the image processing module 317. According to certain embodiments, the image pre-processing module 315 may be included in the image processing module 317.

The image processing module 317 may process the stabilized image for the purpose of outputting the stabilized image to an output device (e.g., a display or a printer). For example, the image processing module 317 may perform at least one of color interpolation, lens shading correction, auto white balance, lateral chromatic aberration correction, optical inverse correction, noise reduction, edge enhancement, gamma correction, and out of focusing.

According to some embodiments, the image processing module 317 may correct an error that is generated upon obtaining the plurality of images. For example, the image processing module 317 may correct a delay generated due to a signal to be transmitted to generate a plurality of exposures. According to certain embodiments, the image processing module 317 may be included in the processor 350.

As such, in the non-limiting example of FIG. 3A the camera module 310 may obtain an image, in which the movement of the electronic apparatus 300 is corrected by using the image pre-processing module 315.

The motion sensing module 320 may sense the movement of the electronic apparatus 300. For example, the motion sensing module 320 may include a gyro sensor and/or an acceleration sensor. For example, the gyro sensor may measure the angular velocity associated with the movement according to the rotational movement of the electronic apparatus 300. The acceleration sensor may measure the acceleration of movement of the electronic apparatus 300 according to the translational movement.

The memory 330 may store an image generated by the camera module 310. For example, the generated image may be an image processed by the processor 350. According to an embodiment, the memory 330 may be a nonvolatile memory such as a flash memory or a hard disk.

The display 340 may display the image generated by the camera module 310. For example, the display 340 may display the generated image.

The processor 350 may control an overall operation of the electronic apparatus 300. For example, the processor 350 may obtain an image from the camera module 310 by using movement information of the electronic apparatus 300 which is received by controlling the motion sensing module 320. The processor 350 may store the generated image in the memory 330 or may display the generated image in the display 340.

According to certain embodiments, the processor 350 may calculate a total exposure time $t_T$ that is needed when the camera module 310 captures an external object. The camera module 310 may capture the external object based on the total exposure time $t_T$. For example, the total exposure time $t_T$ may be calculated based on the brightness of the external object, the capture angle of the external object, the distance from the external object, or the like. As the brightness of the external object is darker, as the capture angle of the external object is wider, or as the distance from the external object is farther, the total exposure time $t_T$ may be longer.

According to some embodiments, the processor 350 may calculate the quantity of displacement of the electronic apparatus 300 through the motion sensing module 320. For example, the processor 350 may receive the angular velocity of the electronic apparatus 300 from the motion sensing module 320 and may integrate the angular velocity to calculate an angle at which the electronic apparatus 300 moves. For example, when an image is captured by the camera module 310, the processor 350 may receive the angular velocity of the electronic apparatus 300 to calculate the movement angle θ of the electronic apparatus 300.

According to at least one embodiment, the motion sensing module 320 may include a separate processor (or a control module). For example, the motion sensing module 320 may directly calculate the quantity of displacement by using the measured angular velocity to transmit the calculated quantity of displacement to the processor 350. For another example, the motion sensing module 320 may share and process the quantity of displacement according to the measured angular velocity with the processor 350.

According to certain embodiments, when the camera module 310 starts to capture an image, the processor 350 may calculate the quantity of displacement of the electronic apparatus 300 based on an initial posture of the electronic apparatus 300. For example, when the camera module 310 starts to capture an image, the processor 350 may receive initial information (e.g., posture information detected by a gyroscope) from the motion sensing module 320 to determine the initial location of the electronic apparatus 300. The processor 350 may calculate the movement angle θ of the electronic apparatus 300 based on the initial location of the camera module 310.

Figure 3B:
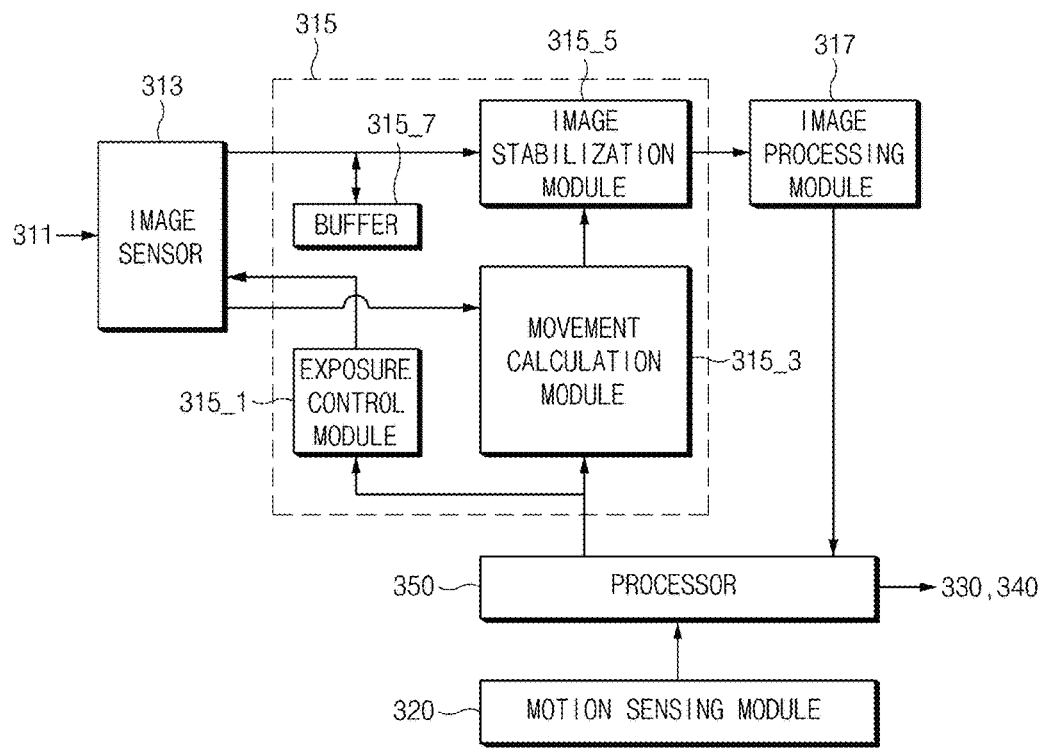
FIG. 3B illustrates, in an enlarged view, part A of FIG. 3A.

FIG. 3B illustrates, in an enlarged view, part A of FIG. 3A.

Referring to FIG. 3B, the image pre-processing module 315 may include an exposure control module 315_1, a movement calculation module 315_3, an image stabilization module 315_5, and a buffer 315_7. For example, each of the movement the exposure control module 315_1, calculation module 315_3, and the image stabilization module 315_5 may be a software module implemented for each operation of an image signal processor or for each function of an image signal processor. The buffer 315_7 may be implemented with a memory.

The exposure control module 315_1 may control an exposure (or an exposure time) that allows light to enter the image sensor 313. For example, after initiating an exposure that allows light to enter the image sensor 313, if the movement angle θ of the electronic apparatus 300 exceeds a critical angle $\theta_{Th}$, the exposure control module 315_1 may interrupt the exposure. For example, a difference between the maximum angle $\theta_{max}$ and the minimum angle $\theta_{min}$ of the movement angle θ of the electronic apparatus 300 exceeds the critical angle $\theta_{Th}$, the exposure control module 315_1 may interrupt the exposure that allows light to enter the image sensor 313. The critical angle $\theta_{Th}$ may be set to an angle at which an amount of specified blur is generated in the generated image.

According to certain embodiments, the exposure control module 315_1 may control the exposure time of the image sensor 313 within a range that does not exceed the total exposure time $t_T$. For example, when interrupting the exposure that allows light to enter the image sensor 313 because the movement angle θ of the electronic apparatus 300 exceeds the critical angle $\theta_{Th}$, the exposure control module 315_1 may restart the exposure in response to the interruption of the exposure. In another example, even though the movement angle θ of the electronic apparatus does not exceed the critical angle $\theta_{Th}$, if the total exposed time (or the sum of time periods when an object is dividedly captured) when light is incident on the image sensor 313 exceeds the total exposure time $t_T$, the exposure control module 315_1 may interrupt the exposure that allows light to enter the image sensor 313. If the exposure that allows light to enter the image sensor 313 is interrupted, the image may be generated by the image sensor 313. As such, the total exposure time $t_T$ may be divided, and then a plurality of images each of which corresponds to the divided exposure time $t_n$ may be obtained.

The movement calculation module 315_3 may, according to certain embodiments, receive information about the exposure time $t_n$ of the obtained image from the image sensor 313. For example, the movement calculation module 315_3 may receive a signal, which is generated upon interrupting the exposure, from the image sensor 313 to determine the exposure time $t_n$ of the obtained image.

According to at least one embodiment, the movement calculation module 315_3 may calculate the quantity of displacement of the obtained image during the exposure time $t_n$. For example, the movement calculation module 315_3 may calculate a representative movement angle $\theta_n$ of the electronic apparatus 300 corresponding to the exposure time $t_n$. For example, the movement calculation module 315_3 may calculate an average value of the movement angle θ of the electronic apparatus 300 as the representative movement angle $\theta_n$ during the exposure time $t_n$. For another example, the movement calculation module 315_3 may calculate an intermediate value between the maximum movement angle and the minimum movement angle of the movement angle θ of the electronic apparatus 300 as the representative movement angle $\theta_n$ during the exposure time $t_n$.

In the non-limiting example of FIG. 3B, image stabilization module 315_5 may obtain a plurality of images, each of which corresponds to the divided exposure time $t_n$, from the image sensor 313. For example, if the exposure that allows light to enter the image sensor 313 is interrupted by the exposure control module 315_1, the image stabilization module 315_5 may obtain (or read out) an image from the image sensor 313.

According to certain embodiments, the image stabilization module 315_5 may receive the representative movement angle $\theta_n$ of each of the obtained plurality of images, from the movement calculation module 315_3. According to some embodiments, the image stabilization module 315_5 may compose the obtained plurality of images by using the representative movement angle $\theta_n$. For example, the image stabilization module 315_5 may calculate the movement amount of a pixel of the obtained image, based on the representative movement angle $\theta_n$. The image stabilization module 315_5 may determine an area to be composed, in the obtained image by using the movement amount of the pixel. According to certain embodiments, the image stabilization module 315_5 may calculate (e.g., image warping) the movement amount of the pixel, depending on the location of the pixel of the obtained image. For example, a pixel at the center of the obtained image may have a movement amount smaller than a pixel at the edge of the obtained image. As such, the image stabilization module 315_5 may calculate the movement amount of a different pixel for each pixel of the obtained image to determine an area to be composed, in the obtained image.

In the non-limiting example of FIG. 3B, the image stabilization module 315_5 may compose the determined composition area of each of the plurality of images. For example, the image stabilization module 315_5 may compose pixels corresponding to each other in the composition area of each of the plurality of images. For example, the pixels corresponding to each other may be pixels obtained by capturing the same area of an external object. As such, image stabilization module 315_5 may compose the plurality of images to generate the stabilized image. The composition of the image stabilization module 315_5 will be described with reference to FIGS. 5 and 6 in detail.

According to some embodiments, the image stabilization module 315_5 may receive the representative movement angle $\theta_n$ corresponding to the exposure time $t_n$ of each of a plurality of images, from the movement calculation module 315_3. According to certain embodiments, the image stabilization module 315_5 may obtain an image from the image sensor 313 by using the representative movement angle $\theta_n$. For example, the image stabilization module 315_5 may determine an area to be output in the image sensor 313 that is going to obtain an image, in consideration of the representative movement angle $\theta_n$. According to at least one embodiment, the image stabilization module 315_5 may obtain a plurality of images from the output area of the image sensor 313 during the exposure time $t_n$ of each of the plurality of images. As such, the image stabilization module 315_5 may compose the plurality of images to generate an image. In detail, the composition of the image stabilization module 315_5 will be described with reference to FIGS. 7 and 8.

According to certain embodiments, the image stabilization module 315_5 may transmit the generated image to the image processing module 317. The image processing module 317 may stabilize the generated image. For example, the image processing module 317 may correct an error according to a delay that is generated while the exposure control module 315_1 and the movement calculation module 315_3 transmit a signal for initiating and interrupting an exposure.

In the non-limiting example of FIG. 3B, the buffer 315_7 may store the image that the image stabilization module 315_5 obtains from the image sensor 313. The image stabilization module 315_5 may load (or read) the image stored in the buffer 315_7. As such, the image stabilization module 315_5 may stably obtain a plurality of images.

Figure 4:
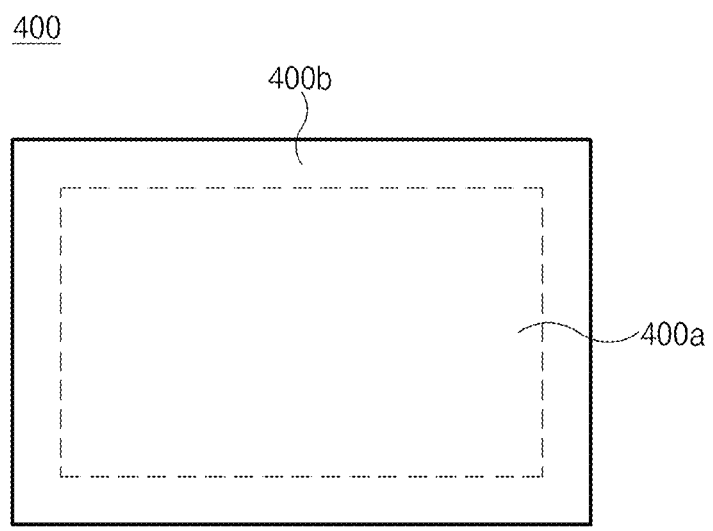
FIG. 4 illustrates an area to be composed in an image obtained by an electronic apparatus, according to certain embodiments of this disclosure.

FIG. 4 illustrates an area to be composed in an image obtained by an electronic apparatus, according to certain embodiments of this disclosure.

Referring to the non-limiting example of FIG. 4, the image stabilization module 315_5 may obtain an image wider than the image to be actually output, from the image sensor 313 for the purpose of preventing hand shaking. In other words, the image stabilization module 315_5 may obtain an image from the entire image sensor 313. An image 400 obtained from the image sensor 313 may include a composition area 400a and a margin area 400b.

The composition area 400a of the image 400 may be an area to be composed by the image stabilization module 315_5. For example, the image stabilization module 315_5 may determine the composition area 400a of each of the plurality of images, in consideration of the representative movement angle $\theta_n$ of each of a plurality of images obtained from the image sensor 313.

According to certain embodiments, the image stabilization module 315_5 may compose the composition area 400a of each of the plurality of images. The image stabilization module 315_5 may compose pixels corresponding to each other in the composition area 400a of each of the plurality of images. For example, the image stabilization module 315_5 may calculate a pixel value of the image composed by summing the amount of incident light during the total time (e.g., a total exposure time $t_T$) when pixels of the image sensor 313 corresponding to the pixels are exposed.

As such, the image stabilization module 315_5 may, according to some embodiments, compose the plurality of images to generate the stabilized image.

Figure 5:
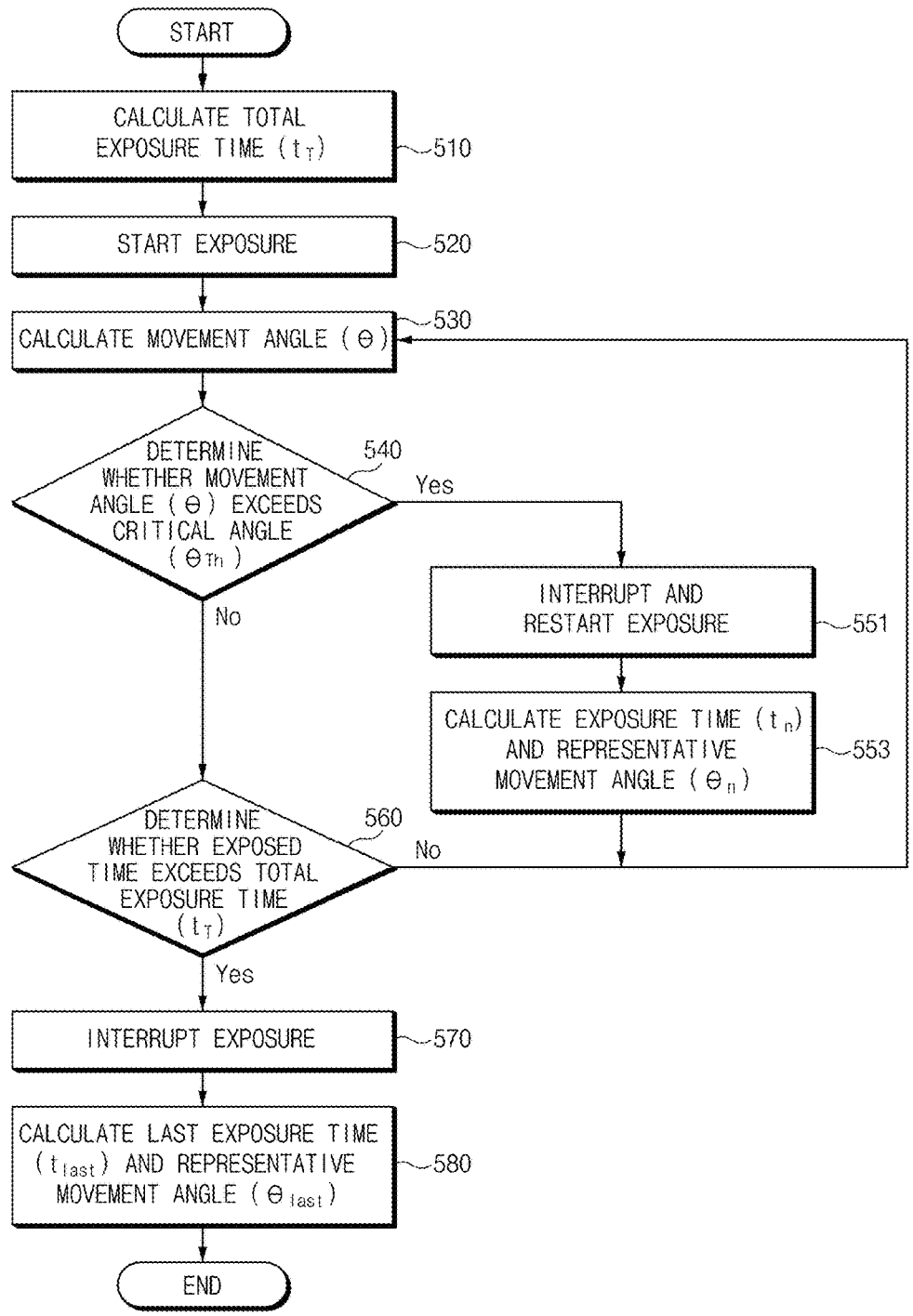
FIG. 5 illustrates, in flowchart format, a method of generating an image stabilized by using an obtained image of an electronic apparatus, according to certain embodiments of this disclosure.

FIG. 5 illustrates, in flowchart format, a method of generating an image stabilized by using an obtained image of an electronic apparatus, according to some embodiments.

Referring to the non-limiting example of FIG. 5, the electronic apparatus 300 may determine a composition area of each of a plurality of images obtained from the image sensor 313 to compose the plurality of images.

According to some embodiments, in operation 510, the electronic apparatus 300 may calculate a total exposure time $t_T$. The electronic apparatus 300 may capture an external object based on the total exposure time $t_T$.

According to at least one embodiment, in operation 520, the electronic apparatus 300 may start an exposure. For example, the electronic apparatus 300 may start a first exposure that allows light to enter the image sensor 313. For example, the electronic apparatus 300 may start the first exposure for obtaining the first image.

In the non-limiting example of FIG. 5, in operation 530, the electronic apparatus 300 may calculate the movement angle $\theta$ of the electronic apparatus 300. For example, the electronic apparatus 300 may calculate the movement angle $\theta$ of the electronic apparatus 300 based on the initial posture of the electronic apparatus 300.

According to some embodiments, in operation 540, the electronic apparatus 300 may determine whether the movement angle $\theta$ of the electronic apparatus 300 exceeds a critical angle $\theta_{Th}$. For example, the electronic apparatus 300 may determine whether a difference between a maximum angle $\theta_{max}$ and a minimum angle $\theta_{min}$ of the movement angle $\theta$ of the electronic apparatus 300 exceeds the critical angle $\theta_{Th}$ during the first exposure.

According to certain embodiments, if the movement angle $\theta$ of the electronic apparatus 300 exceeds the critical angle $\theta_{Th}$, in operation 551, the electronic apparatus 300 may interrupt an exposure and then may start the exposure. For example, if the movement angle $\theta$ of the electronic apparatus 300 exceeds the critical angle $\theta_{Th}$, the electronic apparatus 300 may interrupt the first exposure and may start a second exposure in response to the interruption of the first exposure. According to some embodiments, when the exposure has been interrupted, the electronic apparatus 300 may obtain the image corresponding to the exposure. For example, the electronic apparatus 300 may obtain the first image corresponding to the first exposure.

According to at least one embodiment, in operation 553, the electronic apparatus 300 may calculate an exposure time $t_n$ and the representative movement angle $\theta_n$ of the electronic apparatus 300 corresponding to the exposure time $t_n$. For example, the electronic apparatus 300 may calculate a first exposure time t1 of the first exposure and a first representative movement angle θ1. According to certain embodiments, the electronic apparatus 300 may calculate the movement amount of a pixel of the obtained image based on the representative movement angle $\theta_n$. The electronic apparatus 300 may determine the composition area 400a of the image 400 by using the movement amount of the pixel. According to an embodiment, the electronic apparatus 300 may calculate the movement angle $\theta$ associated with an exposure that is initiated again. For example, in operation 530, the electronic apparatus 300 may calculate the movement angle $\theta$ associated with a second exposure.

According to some embodiments, if the movement angle $\theta$ of the electronic apparatus 300 does not exceed the critical angle $\theta_{Th}$, in operation 560, the electronic apparatus 300 may determine whether the exposed time exceeds the total exposure time $t_T$. According to some embodiments, if the exposed time does not exceed the total exposure time $t_T$, the electronic apparatus 300 may calculate the movement angle $\theta$ associated with the continued exposure. For example, in operation 530, the electronic apparatus 300 may calculate the movement angle $\theta$ associated with the first exposure.

In the non-limiting example of FIG. 5, if the exposure time exceeds the total exposure time $t_T$, in operation 570, the electronic apparatus 300 may interrupt the exposure. For example, the interrupted exposure may be the last exposure. According to some embodiments, when the exposure has been interrupted, the electronic apparatus 300 may obtain the image corresponding to the last exposure. As such, the electronic apparatus 300 may include a plurality of images corresponding to a plurality of exposure.

According to certain embodiments, in operation 580, the electronic apparatus 300 may calculate an exposure time $t_{last}$ of the electronic apparatus 300 associated with the last exposure and a representative movement angle $\theta_{last}$ of the electronic apparatus 300 associated with the exposure time $t_{last}$. According to some embodiments, the electronic apparatus 300 may calculate the movement amount of a pixel of the last image obtained based on the last representative movement angle $\theta_{last}$. The electronic apparatus 300 may determine the composition area 400a of the image 400 by using the movement amount of the pixel.

As such, the electronic apparatus 300 may dynamically change the exposure time of the image sensor 313 in consideration of the movement of the electronic apparatus 300 to obtain a plurality of images, within a range that does not exceed the total exposure time $t_T$ and may select an area composed based on the movement of the electronic apparatus 300, from the obtained plurality of images. Accordingly, the electronic apparatus 300 may generate an image in which the movement is corrected.

Figure 6A:
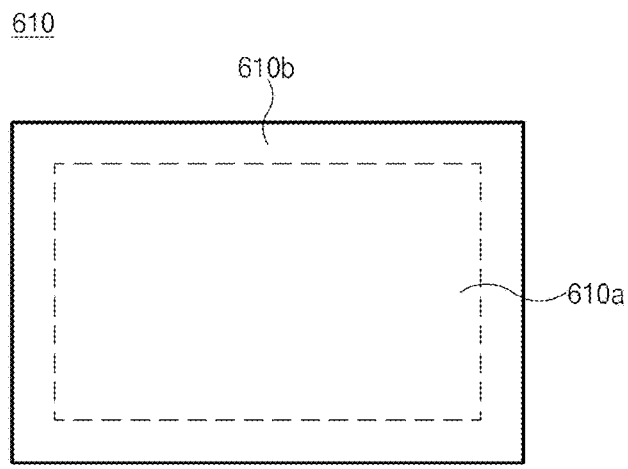
FIGS. 6A, 6B, and 6C illustrates an area in which an image sensor of an electronic apparatus obtains an image, according to certain embodiments.
Figure 6B:
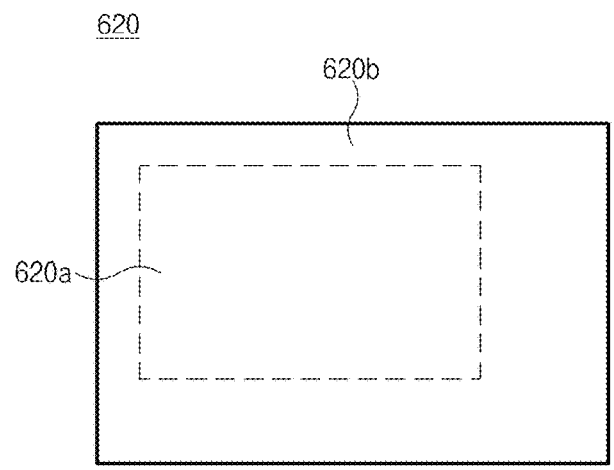
Figure 6C:
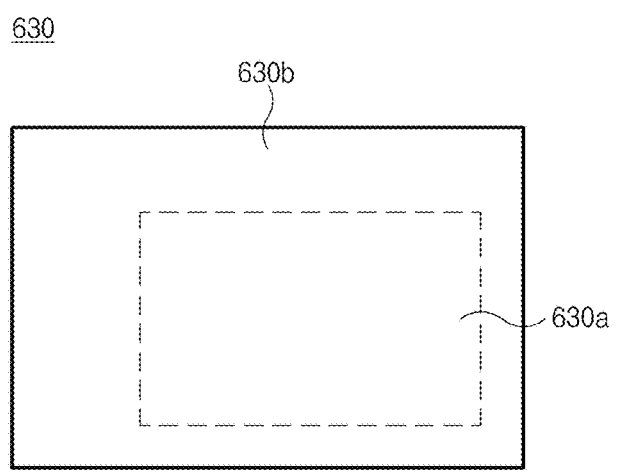

FIGS. 6A, 6B, and 6C illustrates an area in which an image sensor of an electronic apparatus obtains an image, according to certain embodiments.

Referring to the non-limiting example of FIGS. 6A, 6B, and 6C, the image stabilization module 315_5 may obtain an image from a partial area in the image sensor 313 for the purpose of preventing hand shaking. An image sensor 600 may include output areas 610a, 620a, and 630a and margin areas 610b, 620b, and 630b.

According to certain embodiments, the output area of the image sensor 600 may be an area in which an image is output by the image stabilization module 315_5. The image stabilization module 315_5 may receive the quantity of displacement of the electronic apparatus 300 from the movement calculation module 315_3 and may determine the output areas 610a, 620a, and 630a of the image sensor 600 by using the quantity of displacement. For example, the image stabilization module 315_5 may generate shifting information of a pixel of each of a plurality of images to be generated, by using the movement angle θ of the electronic apparatus 300 and may determine the output area of the image sensor 600 in consideration of the shifting of the pixel of the plurality of images to be generated. For example, the image stabilization module 315_5 may determine the output area 610a of the image sensor 600 associated with a first exposure. For another example, the image stabilization module 315_5 may determine the output area 620a of the image sensor 600 associated with a second exposure. For another example, the image stabilization module 315_5 may determine the output area 630a of the image sensor 600 associated with the last exposure.

According to some embodiments, the image stabilization module 315_5 may obtain a plurality of images from the output areas 610a, 620a, and 630a of the image sensor 600, respectively.

As such, the image stabilization module 315_5 may compose the obtained plurality of images to generate an image.

Figure 7:
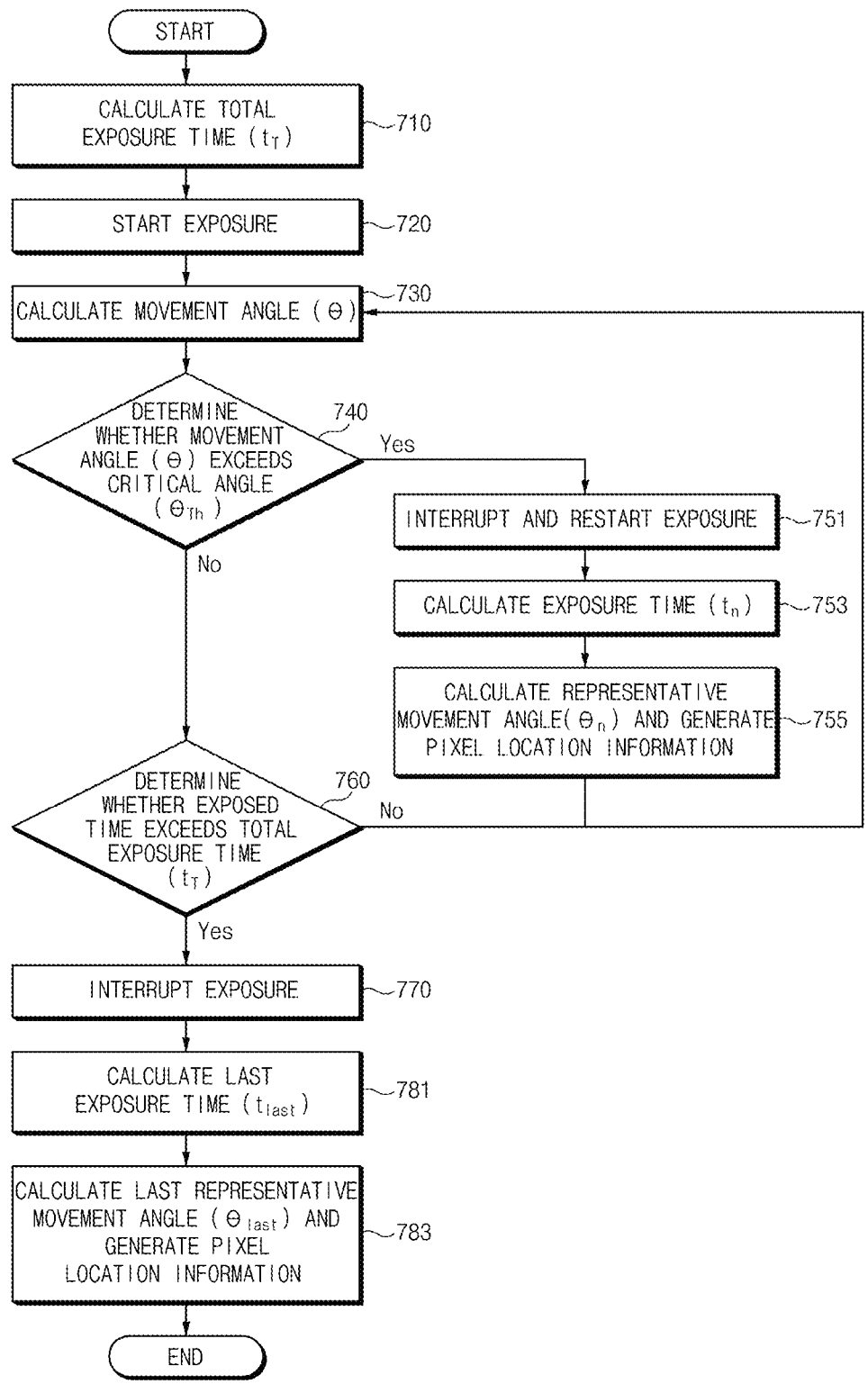
FIG. 7 illustrates, in flowchart format, a method of generating an image stabilized by using an obtained image of an electronic apparatus, according to certain embodiments of this disclosure.

FIG. 7 illustrates, in flowchart format, a method of generating an image stabilized by using an obtained image of an electronic apparatus, according to some embodiments.

Referring to the non-limiting example of FIG. 7, the electronic apparatus 300 may compose a plurality of images obtained from the partial area of the image sensor 313, from the image sensor 313.

According to some embodiments, operation 710, operation 720, operation 730, operation 740, operation 751, operation 760, and operation 770 may be similar to operation 510, operation 520, operation 530, operation 540, operation 551, operation 560, and operation 570 in FIG. 5, respectively.

According to certain embodiments, in operation 730, the electronic apparatus 300 may calculate the movement angle θ of the electronic apparatus 300. According to some embodiments, in operation 740, the electronic apparatus 300 may determine whether the movement angle θ of the electronic apparatus 300 exceeds a critical angle $\theta_{Th}$.

According to some embodiments, if the movement angle θ of the electronic apparatus 300 exceeds the critical angle $\theta_{Th}$, in operation 751, the electronic apparatus 300 may interrupt an exposure and then may start the exposure.

According to certain embodiments, in operation 753, the electronic apparatus 300 may calculate an exposure time $t_n$ when an exposure that allows light to enter the image sensor 313 is initiated and then is interrupted. For example, the electronic apparatus 300 may calculate a first exposure time t1 of a first exposure.

According to some embodiments, in operation 755, the electronic apparatus 300 may generate the representative movement angle $\theta_n$ and location information of a pixel of an image to be generated depending on the representative movement angle $\theta_n$. For example, the electronic apparatus 300 may calculate a movement amount of the pixel of the first image to be generated, based on a first representative movement angle θ1 of the first exposure to generate the location information of the pixel. In the non-limiting example of FIG. 7, the electronic apparatus 300 may determine the output areas 610a, 620a, and 630a of the image sensor 600, by using the location information of the pixel. According to certain embodiments, the electronic apparatus 300 may calculate the movement angle θ associated with an exposure that is initiated again. For example, in operation 530, the electronic apparatus 300 may calculate the movement angle θ associated with a second exposure.

According to some embodiments, in operation 781, the electronic apparatus 300 may calculate an exposure time $t_{last}$ of an electronic apparatus associated with the last exposure.

According to some embodiments, in operation 783, the electronic apparatus 300 may calculate the movement amount of a pixel of the last image to be generated, based on the representative movement angle $\theta_{last}$ associated with the last exposure and the representative movement angle $\theta_n$ to calculate location information of the pixel. According to certain embodiments, the electronic apparatus 300 may determine the output areas 610a, 620a, and 630a of the image sensor 600, by using the location information of the pixel.

According to some embodiments, in the remaining operations, similarly to the image composition of FIG. 5, the electronic apparatus 300 may compose a plurality of images, which are obtained from a part of the image sensor 313, to generate the stabilized image.

As such, the electronic apparatus 300 may effectively obtain an image from only the part of the image sensor 313 by using the movement angle $\theta_n$ of the electronic apparatus 300 and location information of a pixel of each of the plurality of images to be generated.

Figure 8:
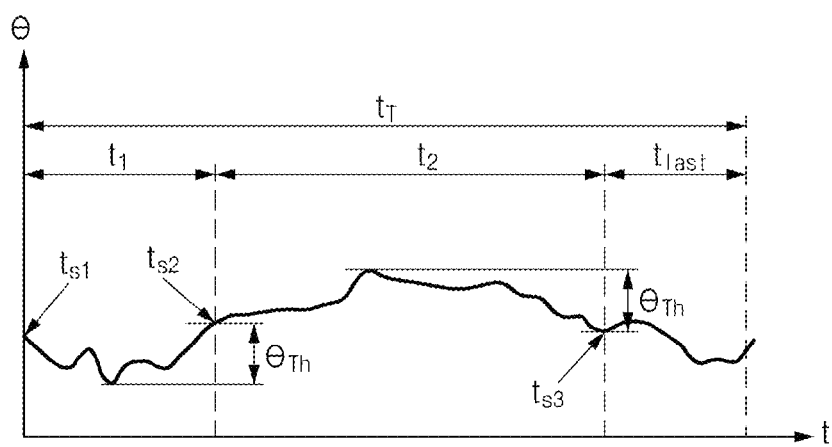
FIG. 8 illustrates aspects of a process to control an exposure by using a critical angle of an electronic apparatus, according to some embodiments of this disclosure.

FIG. 8 illustrates aspects of a process to control an exposure by using a critical angle of an electronic apparatus, according to some embodiments of this disclosure.

Referring to the non-limiting example of FIG. 8, the electronic apparatus 300 may perform a first exposure, a second exposure, and a third exposure (or the last exposure) within a range that does not exceed a total exposure time $t_T$ to obtain a plurality of images.

According to some embodiments, the electronic apparatus 300 may initiate the first exposure at a first time $t_{s1}$; if the movement angle θ of the electronic apparatus 300 exceeds a critical angle $θ_{Th}$, the electronic apparatus 300 may interrupt the first exposure. The electronic apparatus 300 may obtain a first image corresponding to the first exposure and may initiate a second exposure at a second time $t_{s2}$ when the first exposure is interrupted.

According to certain embodiments, if the movement angle θ of the electronic apparatus 300 exceeds the critical angle $θ_{Th}$, the electronic apparatus 300 may interrupt the second exposure and may obtain a second image corresponding to the second exposure. The electronic apparatus 300 may interrupt the second exposure and may initiate a third exposure. According to some embodiments, if the exposed time exceeds the total exposure time $t_T$, the electronic apparatus 300 may interrupt the third exposure and may obtain an image corresponding to the third exposure.

As such, the electronic apparatus 300 may obtain a plurality of images respectively corresponding to the first to third exposures and may compose the plurality of images to generate an image in which the movement of the electronic apparatus 300 is corrected.

Figure 9A:
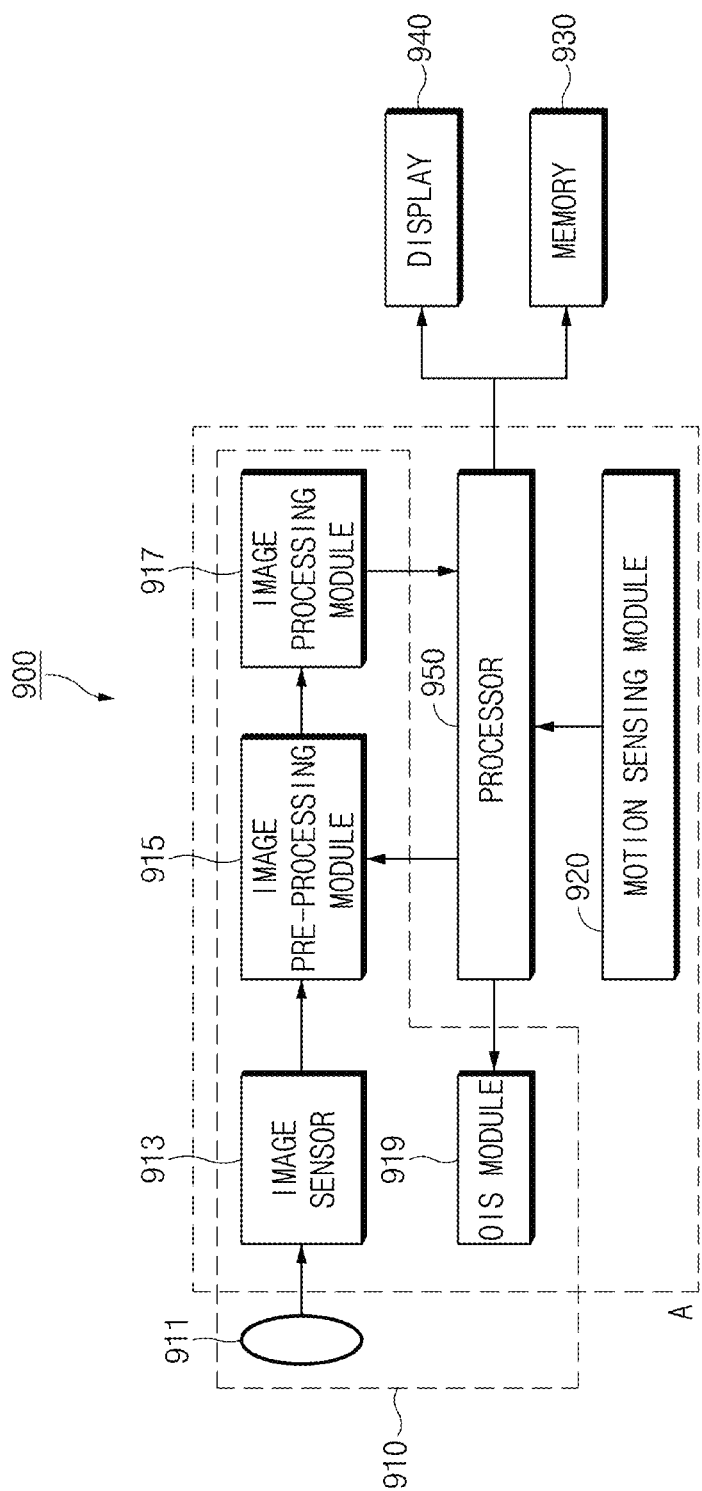
FIG. 9A illustrates, in block diagram format, a configuration of an electronic apparatus, according to certain embodiments of this disclosure.

FIG. 9A illustrates, in block diagram format, a configuration of an electronic apparatus, according to certain embodiments of this disclosure.

Referring to the non-limiting example of FIG. 9A, an electronic apparatus 900 (e.g., the electronic apparatus 101 or 201) may include a camera module 910 (e.g., the camera module 291), a motion sensing module 920 (e.g., the sensor module 240), a memory 930 (e.g., the memory 230), a display 940 (e.g., the display 160 or 260), and a processor 950 (e.g., the processor 120 or 210).

In the non-limiting example of FIG. 9A, motion sensing module 920, the memory 930, and the display 940 may be similar to the motion sensing module 320, the memory 330, and the display 340 of the electronic apparatus 300 in FIG. 3A, respectively.

The camera module 910 may include a lens 911, an image sensor 913, an image pre-processing module 915, an image processing module 917, and an optical image stabilization (OIS) module 919. The lens 911, the image sensor 913, and the image processing module 917 may be similar to the lens 311, the image sensor 313, and the image processing module 317 of FIG. 3A, respectively.

According to certain embodiments, image pre-processing module 915 may pre-process image data received from the image sensor 913. For example, similar to the image pre-processing module 315 in FIG. 3B, the image pre-processing module 915 may perform the correction corresponding to the movement (e.g., movement according to hand shaking) of the electronic apparatus 900. For example, the image pre-processing module 915 may divide a total exposure time when light is incident on the image sensor 913 for the purpose of capturing an external object, and may obtain a plurality of images each of which is generated for each divided time. The image pre-processing module 915 may generate an image obtained by composing and stabilizing the plurality of images.

According to at least one embodiment, the image pre-processing module 915 may transmit the stabilized image to the image processing module 917. According to certain embodiments, the image pre-processing module 915 may be included in the image processing module 917. In addition, the image processing module 917 may be included in the processor 950.

In the non-limiting example of FIG. 9, the OIS module 919 may dynamically adjust the arrangement of the lens 911 and the image sensor 913. The OIS module 919 may finely adjust the arrangement of the lens 911 or the image sensor 913 in a direction opposite to the direction of movement of a hand gripping the electronic apparatus 900. As such, the OIS module 919 may stabilize the shaking of an image that occurs due to the movement of the electronic apparatus 900. According to various embodiments, the OIS module 919 may be referred to as a vibration reduction (VR) module, an image stabilizer (IS), and an optical stabilizer (OS), an anti-shake (AS) module, a steady shot module, and the like, depending on a manufacturer of the electronic apparatus 900.

According to some embodiments, processor 950 may control an overall operation of the electronic apparatus 900. For example, the processor 950 may obtain an image from the camera module 910 by using the movement information of the electronic apparatus 900, which is received by controlling the motion sensing module 920. The processor 950 may store the generated image in the memory 930 or may display the generated image in the display 940.

According to at least one embodiment, when the camera module 910 captures an external object, the processor 950 may calculate a necessary total exposure time $t_T$.

According to at least one embodiment, the processor 950 may calculate the quantity of displacement of the electronic apparatus 900 through the motion sensing module 920. For example, when an image is captured by the camera module 910, the processor 950 may receive the angular velocity of the electronic apparatus 900 to calculate the movement angle θ of the electronic apparatus 900.

According to certain embodiments, the processor 950 may control the OIS module 919 to adjust the arrangement of the lens 911 or the image sensor 913. For example, the processor 950 may calculate a value (e.g., a coordinate value) necessary for the arrangement of the lens 911 or the image sensor 913, by using the calculated movement angle θ of the electronic apparatus 900. The processor 950 may control the arrangement of the lens 911 or the image sensor 913 depending on the calculated value. According to some embodiments, when the processor 950 controls the arrangement of the lens 911 or the image sensor 913, the arrangement of the lens 911 or the image sensor 913 may be arranged in the OIS module 919 to be different from the calculated value. Accordingly, a difference value between the value at which the lens 911 or the image sensor 913 in the OIS module 919 is arranged and the calculated value may be an error.

Figure 9B:
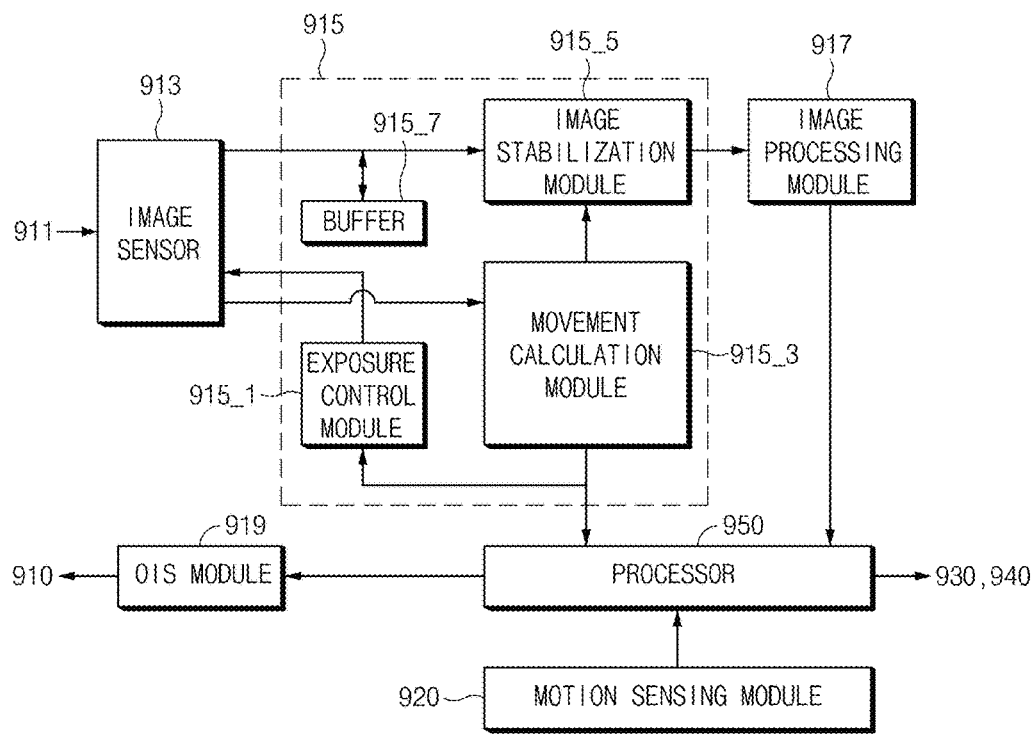
FIG. 9B illustrates, in enlarged view, part A of FIG. 9A.

FIG. 9B illustrates, in an enlarged view, part A of FIG. 9A.

Referring to the non-limiting example of FIG. 9B, the image pre-processing module 915 may include an exposure control module 915_1, a movement calculation module 915_3, an image stabilization module 915_5, and a buffer 915_7. The movement calculation module 915_3, the image stabilization module 915_5, and the buffer 915_7 may be similar to the movement calculation module 315_3, the image stabilization module 315_5, and the buffer 315_7 in FIG. 3B, respectively.

According to certain embodiments, exposure control module 915_1 may control a time (or an exposure time) when light is incident on the image sensor 913. For example, after the exposure control module 915_1 initiates the exposure of the image sensor 913, if an error E occurring while the OIS module 919 adjusts the arrangement of the lens 911 or the image sensor 913 exceeds a critical error $E_{Th}$, the exposure control module 915_1 may interrupt an exposure. For example, if the error E exceeds the critical error $E_{Th}$ because the error E, which occurs in the OIS module 919 while the OIS module 919 adjusts the arrangement of the lens 911 or the image sensor 913, is accumulated, the exposure control module 915_1 may interrupt the exposure of the image sensor 913. The critical error $E_{Th}$ may be set to an error in which an amount of specified blur is generated in the generated image. The critical error $E_{Th}$ may be determined based on the movement angle θ of the electronic apparatus 900.

According to some embodiments, the exposure control module 915_1 may control the exposure of the image sensor 913 within a range that does not exceed the total exposure time $t_T$. For example, when the exposure control module 915_1 interrupts the exposure that allows light to enter the image sensor 913 because the error E occurring in the OIS module 919 of the electronic apparatus 900 is accumulated to exceeds the critical error $E_{Th}$, the exposure control module 915_1 may restart the exposure in response to the interruption of the exposure. For example, even though the error E occurring in the OIS module 919 of the electronic apparatus 900 does not exceed the critical error $E_{Th}$, if the total exposed time (or the sum of time periods when an object is dividedly captured) when light is incident on the image sensor 913 exceeds the total exposure time $t_T$, the exposure control module 915_1 may interrupt the exposure of the image sensor 913. As such, the image pre-processing module 915 may divide the total exposure time $t_T$, and then a plurality of images each of which corresponds to the divided exposure time $t_n$ may be obtained.

According to certain embodiments, the image stabilization module 915_5 may obtain a plurality of images similarly to FIG. 4 and may determine an area to be output of each of the obtained plurality of images by using the representative movement angle $θ_n$ of the electronic apparatus 900 to compose the plurality of images. According to some embodiments, the image stabilization module 915_5 may determine an area for obtaining the image of the image sensor 913 by using the representative movement angle $θ_n$ of the electronic apparatus 900, similarly to FIG. 6, and may obtain a plurality of images from the determined area of the image sensor 913 to compose the plurality of images.

As such, according to certain embodiments, the image pre-processing module 915 may compose the obtained plurality of images through the movement calculation module 915_3, the image stabilization module 915_5, and the buffer 915_7 to generate an image.

Figure 10:
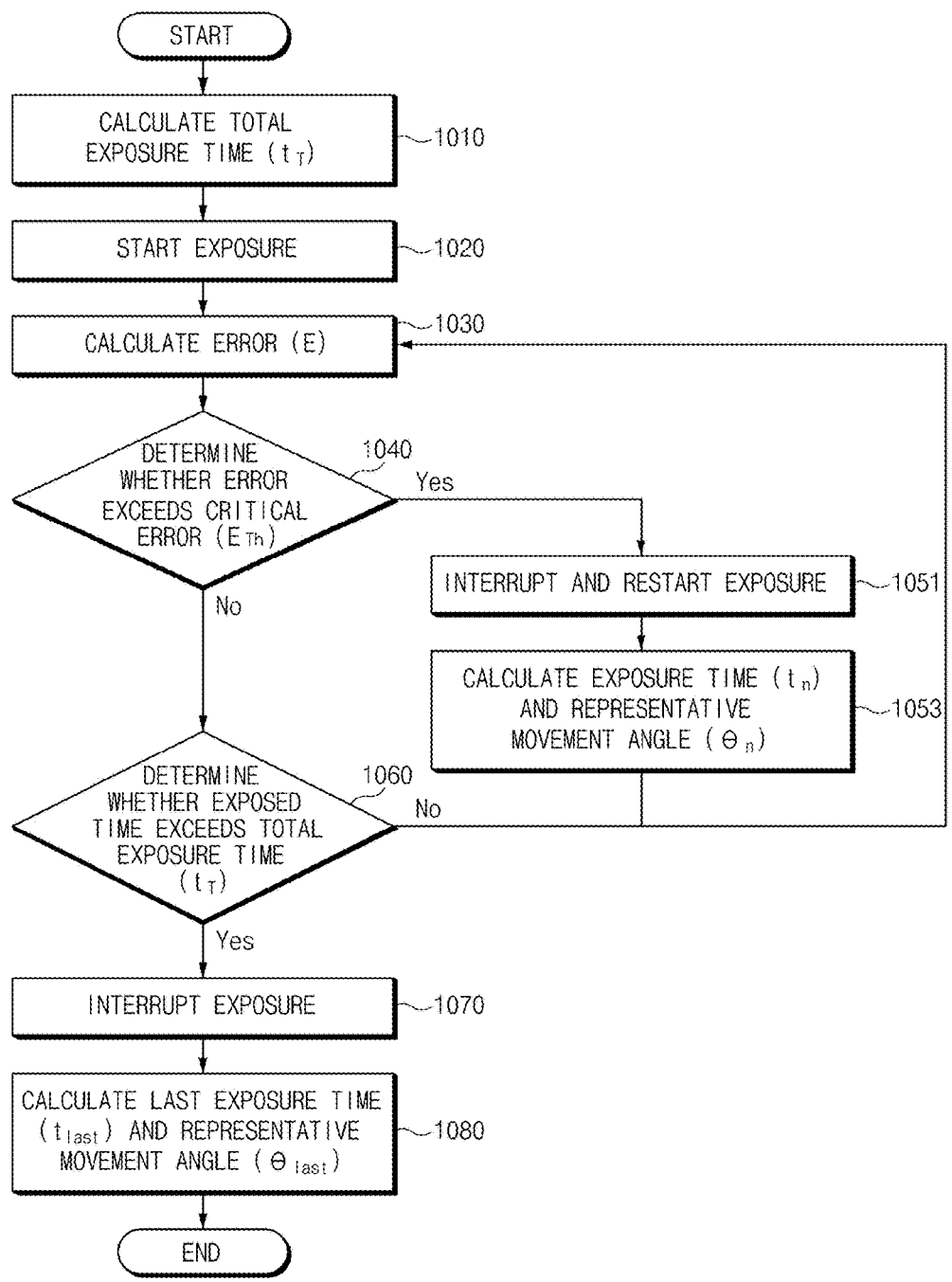
FIG. 10 illustrates, in flowchart format, a method of generating an image stabilized by using an obtained image of an electronic apparatus, according to certain embodiments.

FIG. 10 illustrates, in flowchart format, operations of a method of generating an image stabilized by using an obtained image of an electronic apparatus, according to come embodiments.

Referring to the non-limiting example of FIG. 10, the electronic apparatus 900 may determine an output area of each of a plurality of images obtained from the image sensor 913 to compose the plurality of images.

According to some embodiments, operation 1010, operation 1020, operation 1051, operation 1053, operation 1060, operation 1070, and operation 1080 may be similar to operation 510, operation 520, operation 551, operation 553, operation 560, operation 570, and operation 580 in FIG. 5, respectively.

According to certain embodiments, in operation 1030, the electronic apparatus 900 may calculate an error E that occurs in the OIS module 919 of the electronic apparatus 900. For example, the electronic apparatus 900 may calculate the error E occurring while the OIS module 919 adjusts the arrangement of the lens 911 or the image sensor 913.

According to some embodiments, in operation 1040, the electronic apparatus 900 may determine whether the error E occurring in the OIS module 919 exceeds the critical error $E_{Th}$. For example, the electronic apparatus 900 may determine whether the error E occurring in the OIS module 919 exceeds the critical error $E_{Th}$ because the error E is accumulated.

According to at least one embodiment, if the error E occurring in the OIS module 919 exceeds the critical error $E_{Th}$, in operation 1051, the electronic apparatus 900 may interrupt an exposure and may obtain an image. According to an embodiment, if the error E occurring in the OIS module 919 does not exceed the critical error $E_{Th}$, in operation 1060, the electronic apparatus 900 may determine whether the exposed time exceeds the total exposure time $t_T$.

According to certain embodiments, in the remaining operations, the electronic apparatus 900 may compose a plurality of images by using the exposure time $t_n$ and the representative movement angle $θ_n$, similarly to the image composition of FIG. 5, to generate the stabilized image.

As such, in the non-limiting example of FIG. 9, the electronic apparatus 900 may delay a time when the quantity of displacement by the movement of the electronic apparatus 900 reaches a critical value, within a range that does not exceed the total exposure time $t_T$ by using the OIS module 919 (or OIS) as well as the image pre-processing module 915 (or EIS) to minimize the number of images that are dividedly captured. If the dividedly captured images are minimized, the electronic apparatus 900 may rapidly compose a plurality of images.

Figure 11:
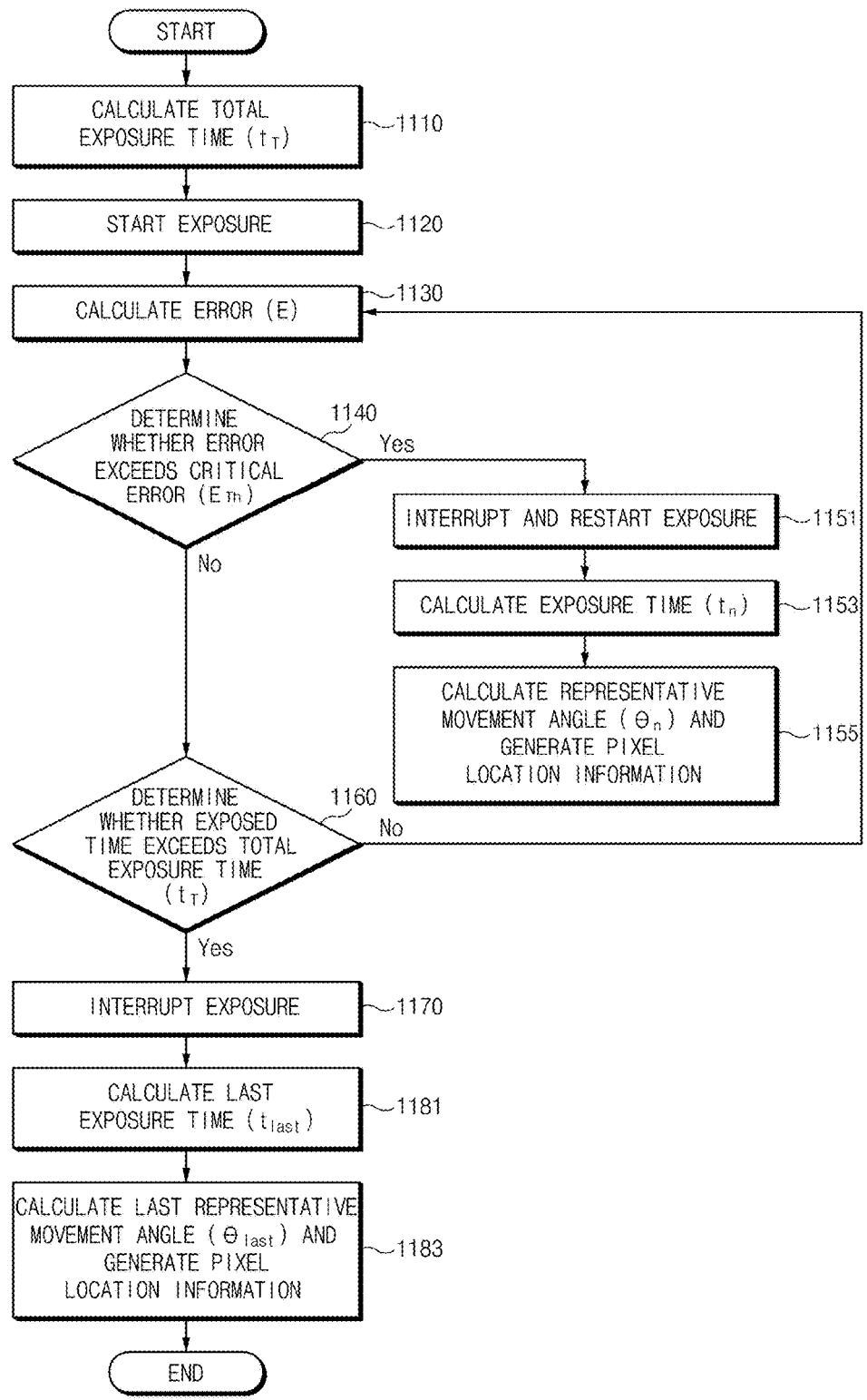
FIG. 11 illustrates, in flowchart format, a method of generating an image stabilized by using an obtained image of an electronic apparatus, according to certain embodiments of this disclosure.

FIG. 11 illustrates, in flowchart format, a method of generating an image stabilized by using an obtained image of an electronic apparatus, according to some embodiments.

Referring to FIG. 11, operation 1110, operation 1120, operation 1151, operation 1153, operation 1155, operation 1160, operation 1170, operation 1181, and operation 1183 may be similar to operation 710, operation 720, operation 751, operation 753, operation 755, operation 760, operation 770, operation 781, and operation 783 in FIG. 7, respectively. In addition, operation 1130 and operation 1140 may be similar to operation 1030 and operation 1040 in FIG. 10, respectively.

According to at least one embodiment, in operation 1130, the electronic apparatus 900 may calculate an error E that occurs in the OIS module 919 of the electronic apparatus 900. According to an embodiment, in operation 1140, the electronic apparatus 900 may determine whether the error E occurring in the OIS module 919 exceeds the critical error $E_{Th}$.

According to certain embodiments, if the error E occurring in the OIS module 919 exceeds the critical error $E_{Th}$, in operation 1151, the electronic apparatus 900 may interrupt an exposure and may restart the exposure. According to some embodiments, the electronic apparatus 900 may obtain the image corresponding to the exposure.

According to certain embodiments, in operation 1153, the electronic apparatus 900 may calculate an exposure time $t_n$ when an exposure that allows light to enter the image sensor 913 is initiated and then is interrupted. According to an embodiment, in operation 1155, the electronic apparatus 900 may generate the representative movement angle $\theta_n$ and the location information of a pixel of an image to be generated depending on the representative movement angle $\theta_n$.

According to some embodiments, if the error E does not exceed the critical error $E_{Th}$, in operation 1160, the electronic apparatus 900 may determine whether the exposed time exceeds the total exposure time $t_T$. According to an embodiment, if the exposure time exceeds the total exposure time $t_T$, in operation 1170, the electronic apparatus 900 may interrupt the exposure. According to at least one embodiment, in operation 1181, the electronic apparatus 900 may calculate an exposure time $t_{last}$ of an electronic apparatus associated with the last exposure. According to certain embodiments, in operation 1183, the electronic apparatus 900 may calculate the movement amount of a pixel of the last image to be generated, based on the representative movement angle $\theta_{last}$ associated with the last exposure and the representative movement angle $\theta_n$ to calculate location information of the pixel. According to some embodiments, the electronic apparatus 900 may determine the output area of the image sensor by using the location information of the pixel.

In the non-limiting example of FIG. 9, in the remaining operations, the electronic apparatus 900 may compose a plurality of images obtained from a part of the image sensor 913 similarly to the image composition of FIG. 5 to generate the stabilized image.

As such, the electronic apparatus 900 may obtain the plurality of images by using the movement angle $\theta_n$ and the location information of a pixel of an image to be generated and may compose the plurality of images to generate the stabilized image.

Figure 12:
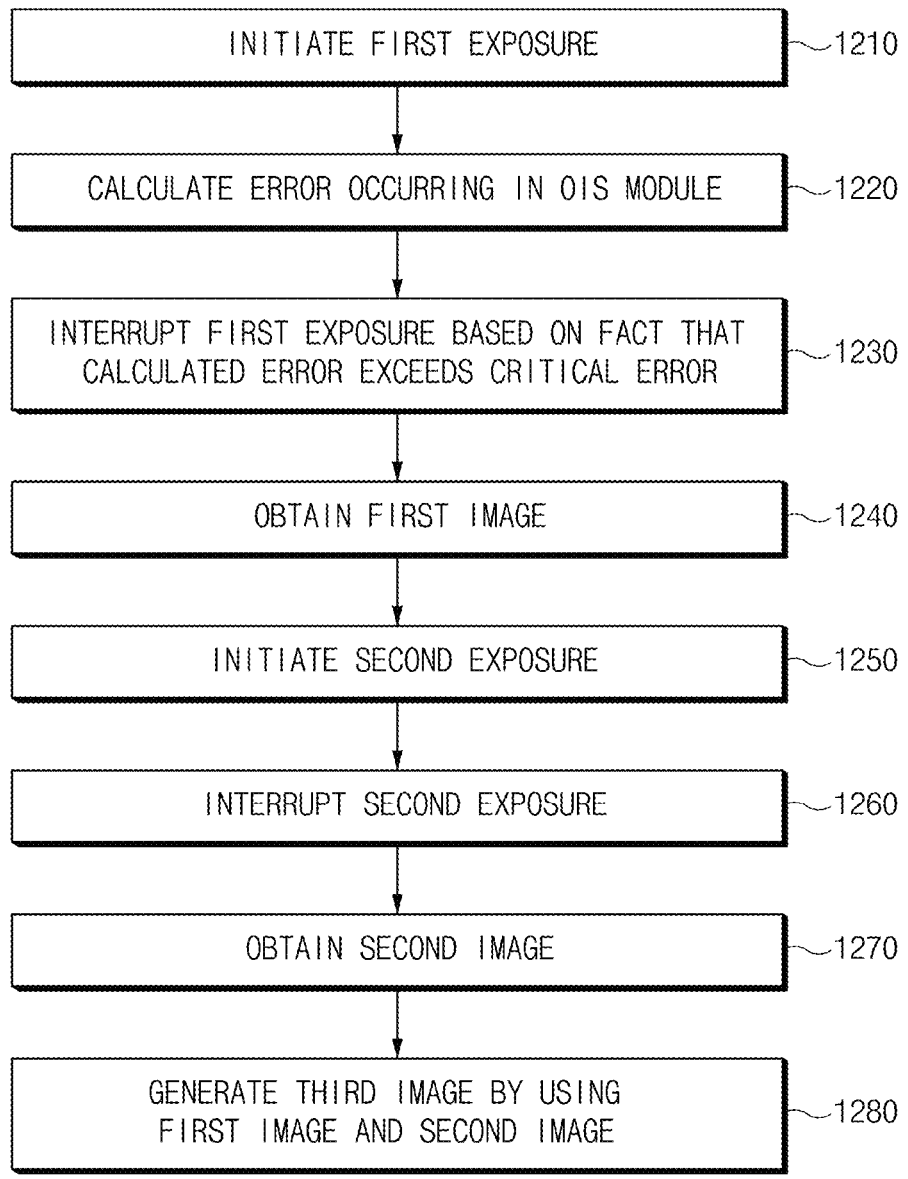
FIG. 12 illustrates, in flowchart format, a method of controlling an electronic apparatus, according to various embodiments of this disclosure.

FIG. 12 illustrates, in flowchart format, a method of controlling an electronic apparatus, according to various embodiments of this disclosure.

The flowchart illustrated in the non-limiting example of FIG. 12 may include operations processed by the above-described electronic apparatus 900 and illustrates the controlling method of the electronic apparatus 900 that controls the exposure of the image sensor 913 within a range that does not exceed a total exposure time $t_T$ to generate an image. Even though omitted below, details about the electronic apparatus 900 described with reference to FIGS. 1 to 11 may be applied to the flowchart illustrated in FIG. 12.

According to certain embodiments, in operation 1210, the electronic apparatus 900 may initiate a first exposure that allows light generated or reflected from an external object to enter the image sensor 913 for the purpose of obtaining an image.

According to some embodiments, in operation 1220, during the first exposure, the electronic apparatus 900 may calculate an error E occurring while the OIS module 919 dynamically adjusts the arrangement of the lens 911 or the image sensor 913 in response to the movement of the electronic apparatus 900 sensed from the motion sensing module 920.

According to at least one embodiment, in operation 1230, if the calculated error E exceeds a critical error $E_{Th}$, the electronic apparatus 900 may interrupt the first exposure.

According to certain embodiments, in operation 1240, the electronic apparatus 900 may obtain a first image corresponding to the first exposure.

According to some embodiments, in operation 1250, the electronic apparatus 900 may initiate a second exposure that allows light generated or reflected from an external object to enter the image sensor 913 for the purpose of obtaining an image, in response to the interruption of the first exposure.

According to some embodiments, in operation 1260, the electronic apparatus 900 may interrupt the second exposure within a range that does not exceed a total exposure time $t_T$.

In the non-limiting example of FIG. 12, in operation 1270, the electronic apparatus 900 may obtain a second image corresponding to the second exposure.

According to certain embodiments, in operation 1280, the electronic apparatus 900 may generate a third image by using the first image and the second image. For example, the electronic apparatus 900 may compose the first image and the second image to generate the third image.

The term "module," as used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

Various embodiments as set forth herein may be implemented as software (e.g., the program 140) including one or more instructions that are stored in a storage medium (e.g., memory 130) that is readable by a machine. For example, a processor (e.g., the processor 120) of the machine (e.g., the electronic device 101), may invoke at least one of the one or more instructions stored in the storage medium, and execute it, with or with using one or more other components under the control of the processor. This allows the machine to be operated to perform at least one function according to the at least one instruction invoked. The one or more instructions may include a code generated by a compiler or a code executed by an interpreter. The machine-readable storage medium may be provided in the form of a non-transitory storage medium. Wherein, the term "non-transitory" simply means that the storage medium is a tangible device, and does not include a signal (e.g., an electromagnetic wave), but his term does not differentiate between where data is semi-permanently stored in the storage medium and where the data is temporarily stored in the storage medium.

According to an embodiment, a method may be included and provided in a computer program product. The computer program product may be distributed in the form of a machine-readable storage medium (e.g., a compact disc read only memory (CD-ROM)).

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:
 a camera module including an optical image stabilizer (OIS) module and an image sensor; and
 at least one processor configured to:
  control the camera module to initiate a first exposure for allowing light generated or reflected from an external object to enter the image sensor,
  calculate an error based on an operation of the OIS module responsive to a movement of the electronic apparatus during at least part of time of the first exposure,
  interrupt the first exposure and obtain a first image corresponding to the first exposure, based on a determination that the calculated error exceeds a critical value,
  initiate a second exposure for allowing light generated or reflected from the external object to enter the image sensor, in response to interruption of the first exposure,
  obtain a second image corresponding to the second exposure, and
 generate a third image, in which at least part of the movement is corrected, by using the first image and the second image.

2. The electronic apparatus of claim 1, wherein the at least one processor includes a first processor and a second processor, and
 wherein the first processor is configured to:
  obtain the first image and the second image; and
  generate the third image by using the first image and the second image, and
 wherein the second processor is configured to:
  sense the movement of the electronic apparatus to transmit information about the movement of the electronic apparatus to the OIS module; and
  calculate the error based on the operation of the OIS module.

3. The electronic apparatus of claim 1, wherein the at least one processor is configured to:
 interrupt the second exposure within a range in which a time when the first exposure and the second exposure are made does not exceed a specified time.

4. The electronic apparatus of claim 3, wherein the specified time is an exposure time necessary for the camera module to capture the external object based on brightness of the external object.

5. The electronic apparatus of claim 1, wherein the error occurring in the OIS module is a difference value between a calculated value necessary to arrange a lens or the image sensor of the OIS module and a value at which the lens or the image sensor adjusted by the OIS module is arranged, in response to the movement of the electronic apparatus.

6. The electronic apparatus of claim 1, wherein the at least one processor is configured to:
 determine a first composition area in the first image, based on the movement of the electronic apparatus sensed from a motion sensing module during the first exposure;
 determine a second composition area in the second image, based on the movement of the electronic apparatus sensed from the motion sensing module during the second exposure; and
 generate the third image by using the first composition area of the first image and the second composition area of the second image.

7. The electronic apparatus of claim 6, wherein the first composition area of the first image and the second composition area of the second image include a pixel obtained by capturing a same area of the external object.

8. The electronic apparatus of claim 6, wherein the movement of the electronic apparatus is defined as a movement angle calculated based on an initial posture of the electronic apparatus, when the at least one processor initiates the first exposure.

9. The electronic apparatus of claim 6, wherein the at least one processor is configured to:
 determine the first composition area of the first image and the second composition area of the second image, during the first exposure or the second exposure based on an average value of movement or an intermediate value between maximum movement and minimum movement, which is calculated based on an initial posture of the electronic apparatus upon initiating the first exposure.

10. The electronic apparatus of claim 1, wherein the processor is configured to:
 obtain the first image based on the movement of the electronic apparatus sensed from a motion sensing module during the first exposure; and
 obtain the second image based on the movement of the electronic apparatus sensed from the motion sensing module during the second exposure.

11. The electronic apparatus of claim 10, wherein the at least one processor is configured to:
 during the first exposure, determine a first output area to be output in the image sensor based on the movement of the electronic apparatus sensed from the motion sensing module and obtain the first image from the first output area of the image sensor; and
 during the second exposure, determine a second output area to be output in the image sensor based on the movement of the electronic apparatus sensed from the motion sensing module and obtain the second image from the second output area of the image sensor.

12. The electronic apparatus of claim 11, wherein the first output area of the image sensor for obtaining the first image and the second output area of the image sensor for obtaining the second image include a pixel obtained by capturing a same area of the external object.

13. A controlling method of an electronic apparatus, the method comprising:
 initiating a first exposure for allowing light generated or reflected from an external object to enter an image sensor, through a camera module;
 calculating an error based on an operation of an OIS module responsive to a movement of the electronic apparatus sensed from a motion sensing module during at least part of time of the first exposure;
 interrupting the first exposure based on a determination that the calculated error exceeds a critical value;
 obtaining a first image corresponding to the first exposure;
 initiating a second exposure for allowing light generated or reflected from the external object to enter the image sensor, in response to interruption of the first exposure;
 obtaining a second image corresponding to the second exposure; and
 generating a third image, in which at least part of the movement is corrected, by using the first image and the second image.

14. The method of claim 13, further comprising:
  interrupting the second exposure within a range in which a time when the first exposure and the second exposure are made does not exceed a specified time.

15. The method of claim 13, wherein the generating of the third image includes:
  determining a first composition area in the first image, based on the movement of the electronic apparatus sensed from the motion sensing module during the first exposure;
  determining a second composition area in the second image, based on the movement of the electronic apparatus sensed from the motion sensing module during the second exposure; and
  generating the third image by using the first composition area of the first image and the second composition area of the second image.

16. The method of claim 15, wherein the first composition area of the first image and the second composition area of the second image include a pixel obtained by capturing a same area of the external object.

17. The method of claim 15, wherein the determining the composition area in the first image includes:
  determining the first composition area in the first image by using a movement angle calculated based on an initial posture of the electronic apparatus upon initiating the first exposure, during the first exposure, and
  wherein the determining the second composition area in the second image includes:
  determining the second composition area in the second image by using the movement angle calculated based on the initial posture of the electronic apparatus upon initiating the first exposure, during the second exposure.

18. The method of claim 13, wherein the obtaining of the first image includes:
  obtaining the first image based on the movement of the electronic apparatus sensed from the motion sensing module during the first exposure, and
  wherein the obtaining of the second image includes:
  obtaining the second image based on the movement of the electronic apparatus sensed from the motion sensing module during the second exposure.

19. A non-transitory computer-readable recording medium comprising program code, which when executed by a processor causes a camera module to:
  initiate a first exposure for allowing light generated or reflected from an external object to enter an image sensor, through the camera module;
  calculate an error based on an operation of an OIS module responsive to a movement of an electronic apparatus sensed from a motion sensing module during at least part of time of the first exposure;
  interrupt the first exposure based on a determination that the calculated error exceeds a critical value;
  obtain a first image corresponding to the first exposure;
  initiate a second exposure for allowing light generated or reflected from the external object to enter the image sensor, in response to the interruption of the first exposure;
  obtain a second image corresponding to the second exposure; and
  generate a third image, in which at least part of the movement is corrected, by using the first image and the second image.

20. The non-transitory computer-readable recording medium of claim 19, further comprising program code which when executed by the processor, causes the camera module to:
  interrupt the second exposure based on a determination that a time when the first exposure and the second exposure are made satisfies a specified time.

* * * * *